US009946299B1

(12) United States Patent
Stewart-Acosta

(10) Patent No.: US 9,946,299 B1
(45) Date of Patent: *Apr. 17, 2018

(54) METHOD AND APPARATUS FOR A USER CONFIGURABLE DOCKING SYSTEM

(71) Applicant: Peter-Jason Patrick Stewart-Acosta, Modesto, CA (US)

(72) Inventor: Peter-Jason Patrick Stewart-Acosta, Modesto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/008,343

(22) Filed: Jan. 27, 2016

Related U.S. Application Data

(63) Continuation of application No. 13/624,924, filed on Sep. 22, 2012, now Pat. No. 9,292,047.

(60) Provisional application No. 61/538,643, filed on Sep. 23, 2011.

(51) Int. Cl.
*G06F 1/16* (2006.01)
*H01R 13/631* (2006.01)
*H04B 1/3877* (2015.01)

(52) U.S. Cl.
CPC ....... *G06F 1/1632* (2013.01); *H01R 13/6315* (2013.01); *H04B 1/3877* (2013.01)

(58) Field of Classification Search
CPC .................................................. G06F 1/1632
USPC ................... 361/679.01, 679.41, 679.44
See application file for complete search history.

(56) References Cited

U.S. PATENT DOCUMENTS

| | | | |
|---|---|---|---|
| 6,504,710 B2 * | 1/2003 | Sutton | B60R 11/0252 312/223.1 |
| 6,994,575 B1 | 2/2006 | Clark | |
| 7,639,482 B1 | 12/2009 | Griffin | |
| 8,083,195 B2 | 12/2011 | Osada | |
| 8,848,361 B2 | 9/2014 | Holzer | |
| 2008/0237416 A1 * | 10/2008 | Osada | F16M 13/00 248/176.1 |
| 2008/0270664 A1 | 10/2008 | Camevali | |
| 2009/0154737 A1 | 6/2009 | Ostler | |
| 2009/0190142 A1 | 7/2009 | Taylor | |
| 2011/0104941 A1 * | 5/2011 | Chang | H01R 13/6315 439/530 |
| 2011/0164375 A1 | 7/2011 | Hayashida et al. | |

* cited by examiner

*Primary Examiner* — Mukund G Patel
(74) *Attorney, Agent, or Firm* — Heimlich Law, PC; Alan Heimlich, Esq.

(57) ABSTRACT

A Method and Apparatus for a User Configurable Docking System have been disclosed. In one embodiment of the invention, an electrical connector and a back support are adjustable by a user.

4 Claims, 25 Drawing Sheets

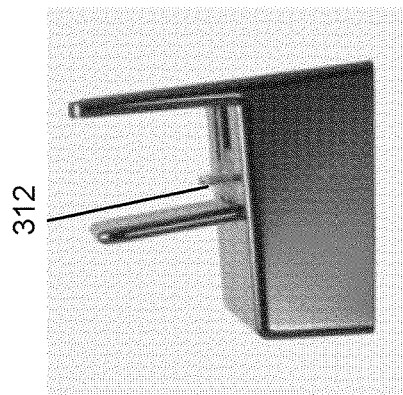
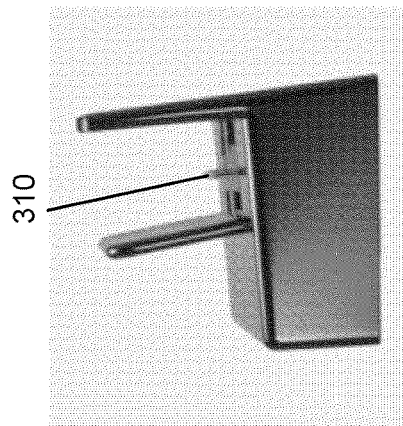
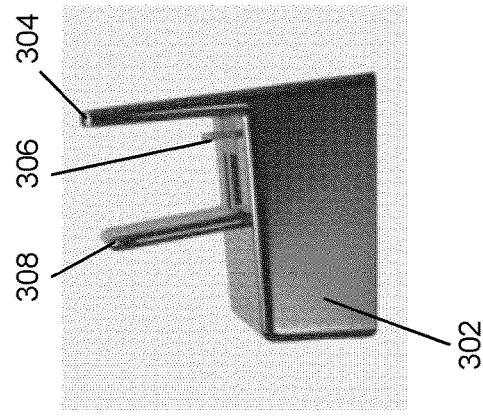
FIG. 3

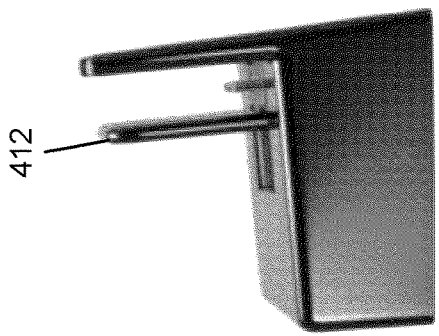
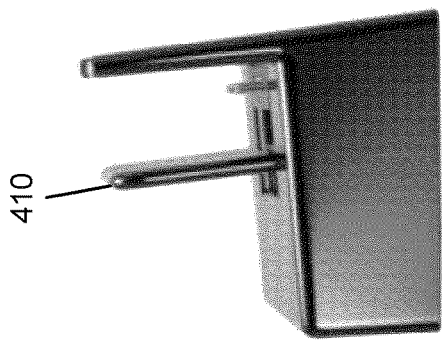
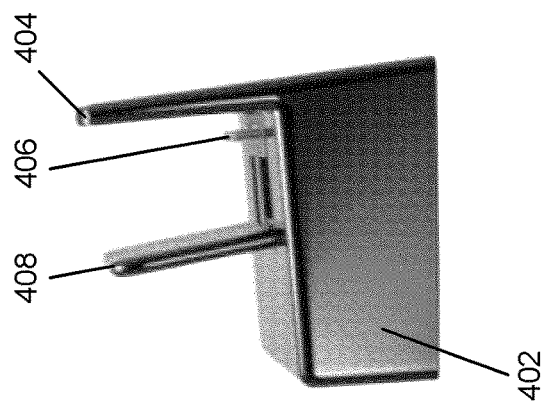
FIG. 4

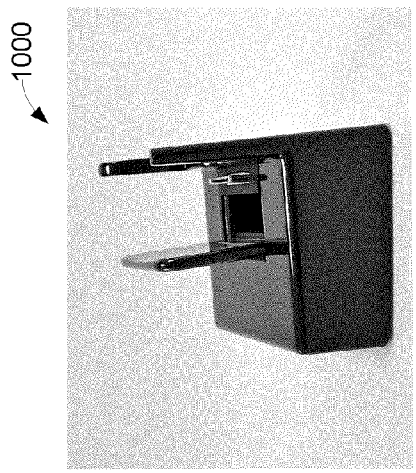
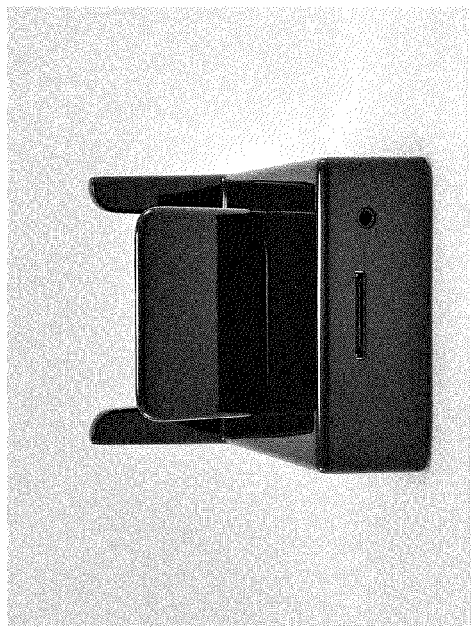
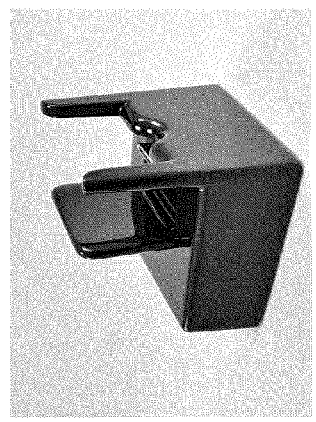
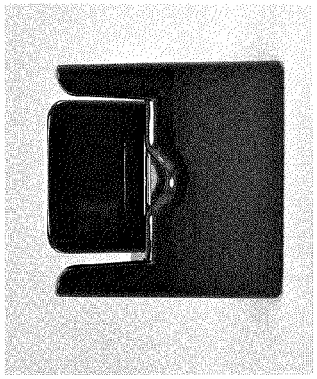
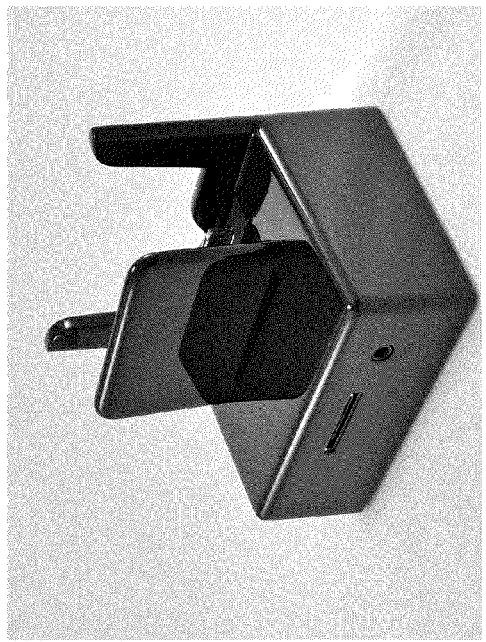
FIG. 10

FIG. 11

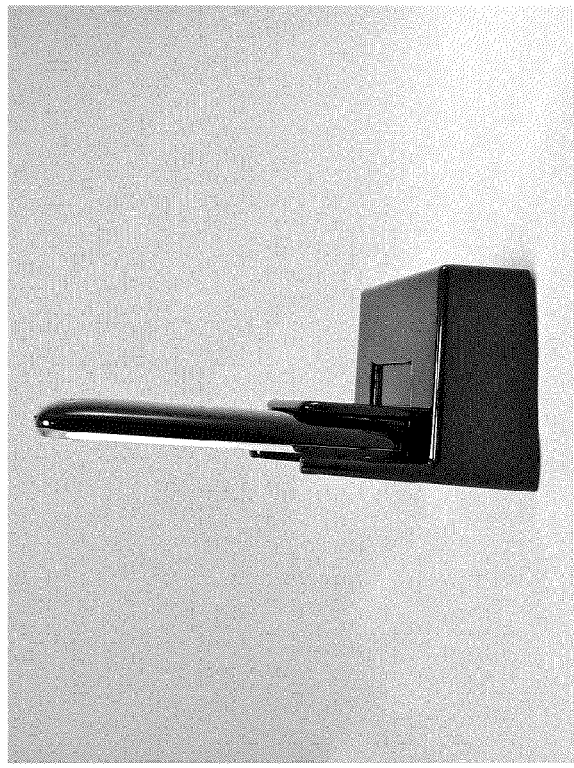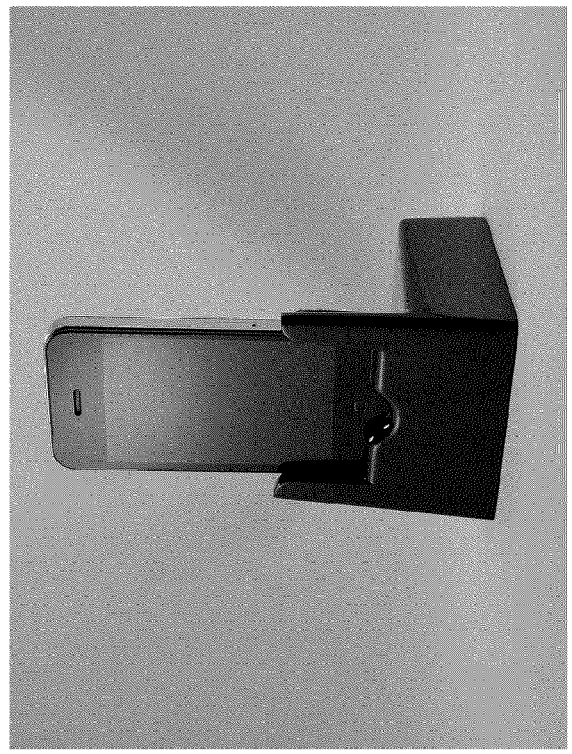
FIG. 14

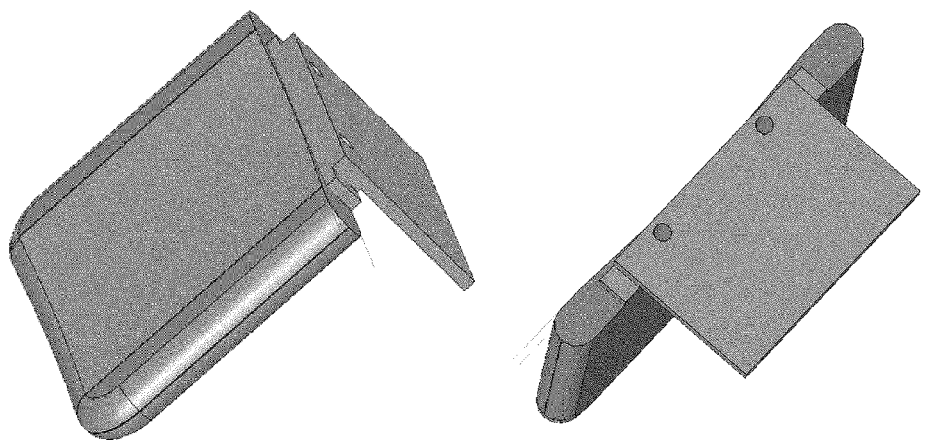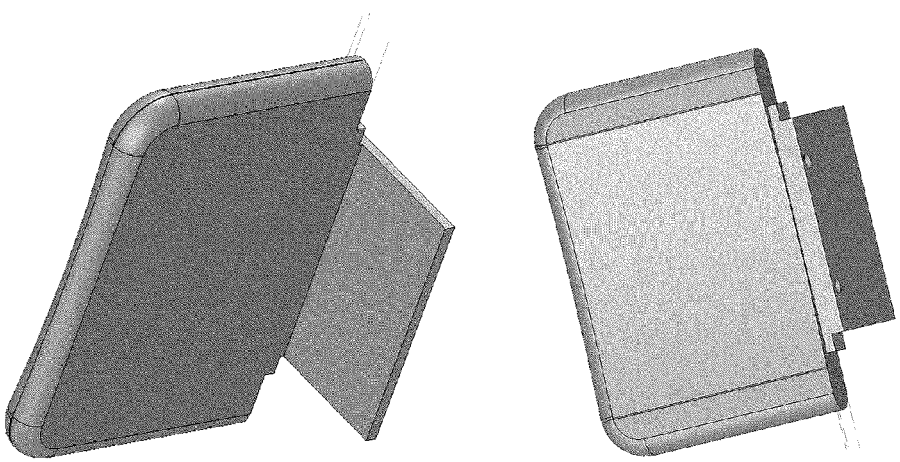
FIG. 18

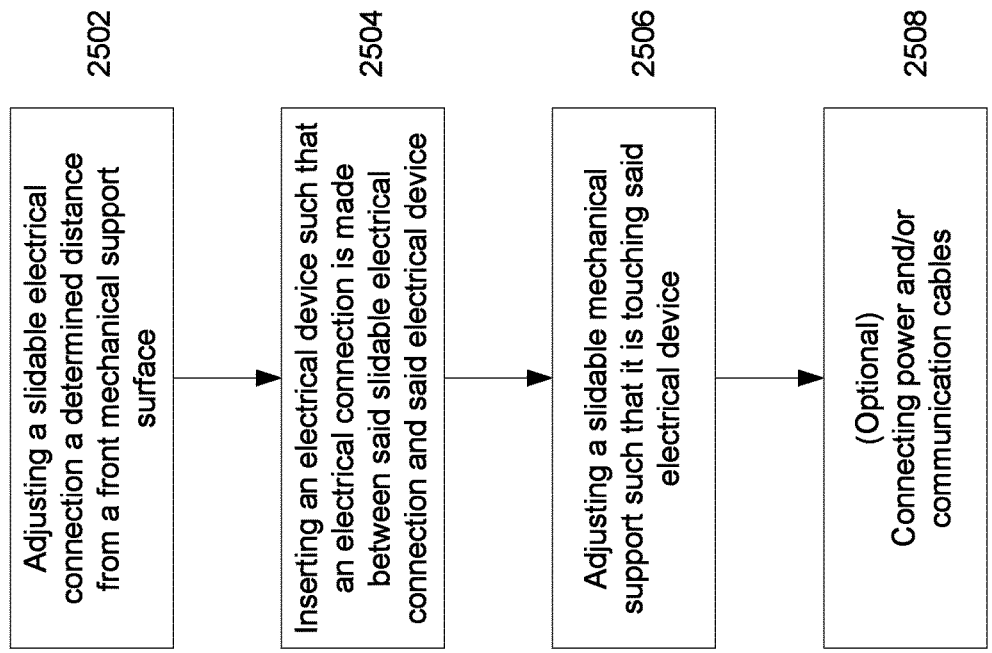

METHOD AND APPARATUS FOR A USER CONFIGURABLE DOCKING SYSTEM

RELATED APPLICATION

The present application for patent is related to U.S. Patent application No. 61/538,643 entitled "Method and Apparatus for a User Configurable Docking System" filed Sep. 23, 2011, expired, and which is hereby incorporated fully herein by reference. The present application for patent is related to U.S. patent application Ser. No. 13/624,924 entitled "Method and Apparatus for a User Configurable Docking System" filed Sep. 22, 2012, pending, and which is hereby incorporated fully herein by reference.

FIELD OF THE INVENTION

The present invention pertains to a docking system. More particularly, the present invention relates to a Method and Apparatus for a User Configurable Docking System.

BACKGROUND OF THE INVENTION

Docking systems are ubiquitous today with the advent of portable electronic devices. Docking is used to transfer files, play music, recharge devices, etc.'

Smartphones ("phone") are particularly popular and come in a variety of sizes, shapes, thicknesses, etc. To address this variety many come with a user installable cable such as a cable from the device to a USB cable. This is difficult to install and often requires the user to lay the phone in a horizontal position which may limit viewing. This presents a technical problem needing a technical solution.

Additionally, users may put covers on their phone which changes the dimensions and so a fixed size docking system will likely not work. This presents a technical problem needing a technical solution.

BRIEF DESCRIPTION OF THE DRAWINGS

The invention is illustrated by way of example and not limitation in the figures of the accompanying drawings in which:

FIG. 2 is a block diagram of a computer system which some embodiments of the invention may employ parts of; and FIGS. 3 through 25 illustrate various embodiments of the present invention.

DETAILED DESCRIPTION

A Method and Apparatus for a User Configurable Docking System is disclosed.

In one embodiment of the invention a user may adjust a slidable connector.

In one embodiment of the invention a user may adjust a slidable support plate.

In one embodiment of the invention a user may adjust a slidable connector to a position to fit a phone connector and adjust a slidable support to hold the phone.

In one embodiment of the invention the docking system has connectors for connections to such things as, but not limited to, a power connector, an audio jack, a video jack, etc.

In one embodiment of the invention the docking system is heavily weighted to maintain position.

FIG. 3 illustrates, generally at 300, one embodiment of the invention—a side view. At 302 is a base. At 304 a front support. At 306 a slidable connector. At 308 a slidable back support. At 310 an intermediate position, at 312 another position. From 306 near front to 312 near back is adjustable range of connector (306, 310, 312).

FIG. 4 illustrates, generally at 400, one embodiment of the invention—a side view. At 402 is a base. At 404 a front support. At 406 a slidable connector. At 408 a slidable back support. At 410 an intermediate position, at 412 another position. From 412 near front to 408 near back is adjustable range of back support (408, 410, 412).

Figure 5:
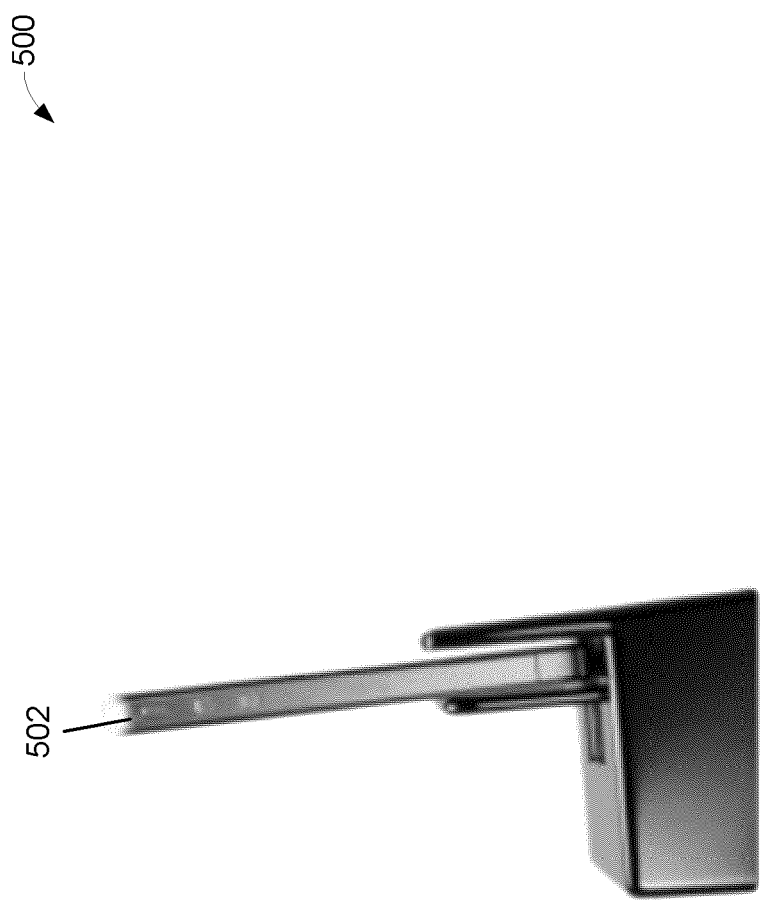

FIG. 5 illustrates, generally at 500, one embodiment of the invention—a side view shown holding a phone 502 without a case.

Figure 6:
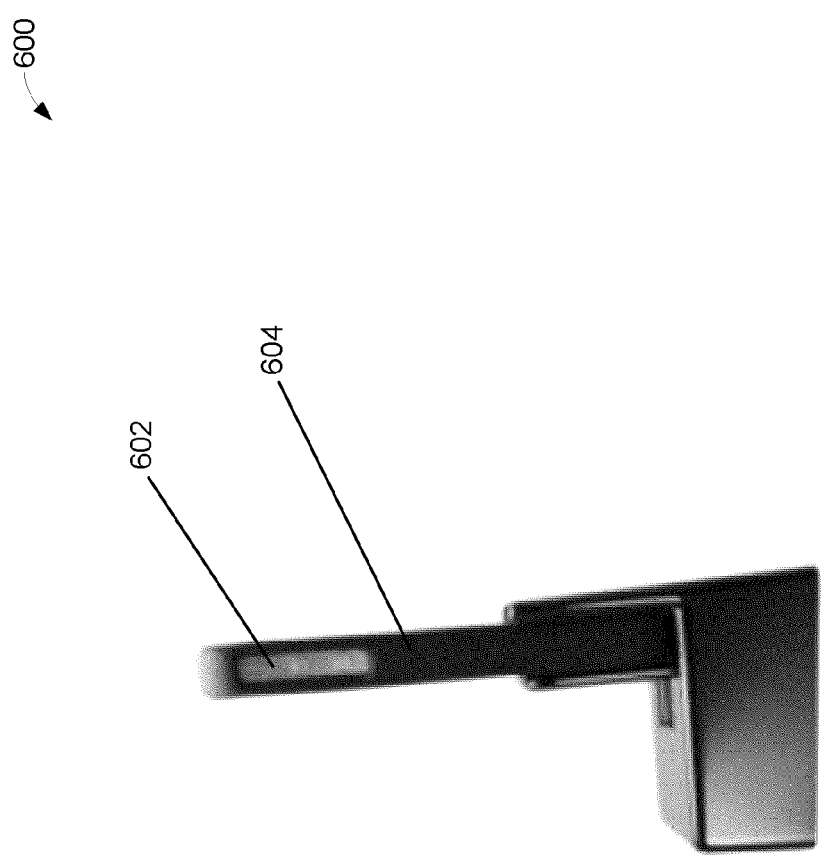

FIG. 6 illustrates, generally at 600, one embodiment of the invention—a side view shown holding a phone 602 in a case 604.

Figure 7:
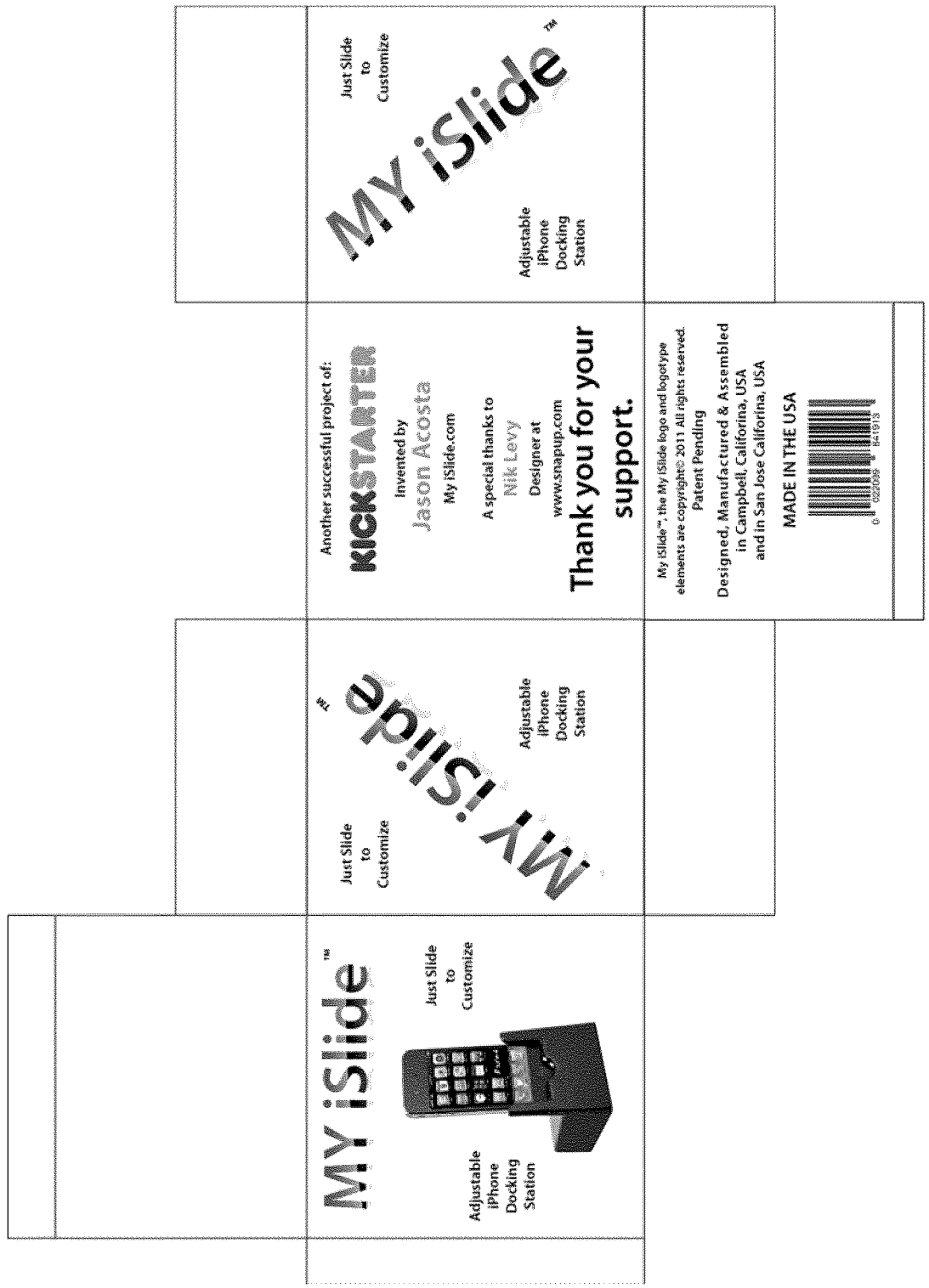

FIG. 7 illustrates, generally at 700, one embodiment of the invention showing packaging.

Figure 8:
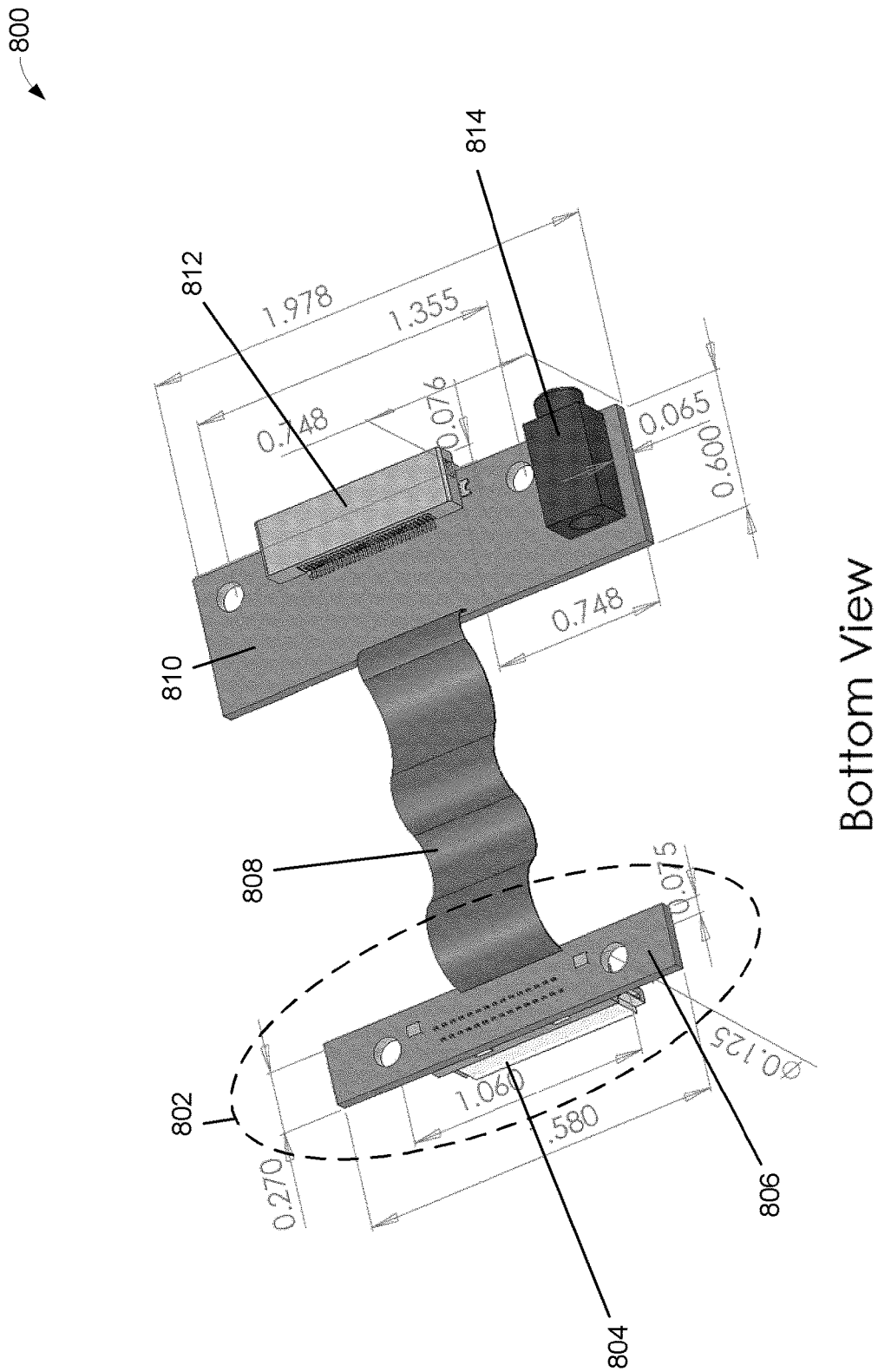

FIG. 8 illustrates, generally at 800, one embodiment of the invention showing a bottom view of a cable assembly. At 802 is the slidable connector assembly having a connector 804 and a PCB (Printed Circuit Board) 806. 808 is a flexible cable. 810 is a second PCB having an external connector 812 and an external audio jack at 814.

Figure 9:
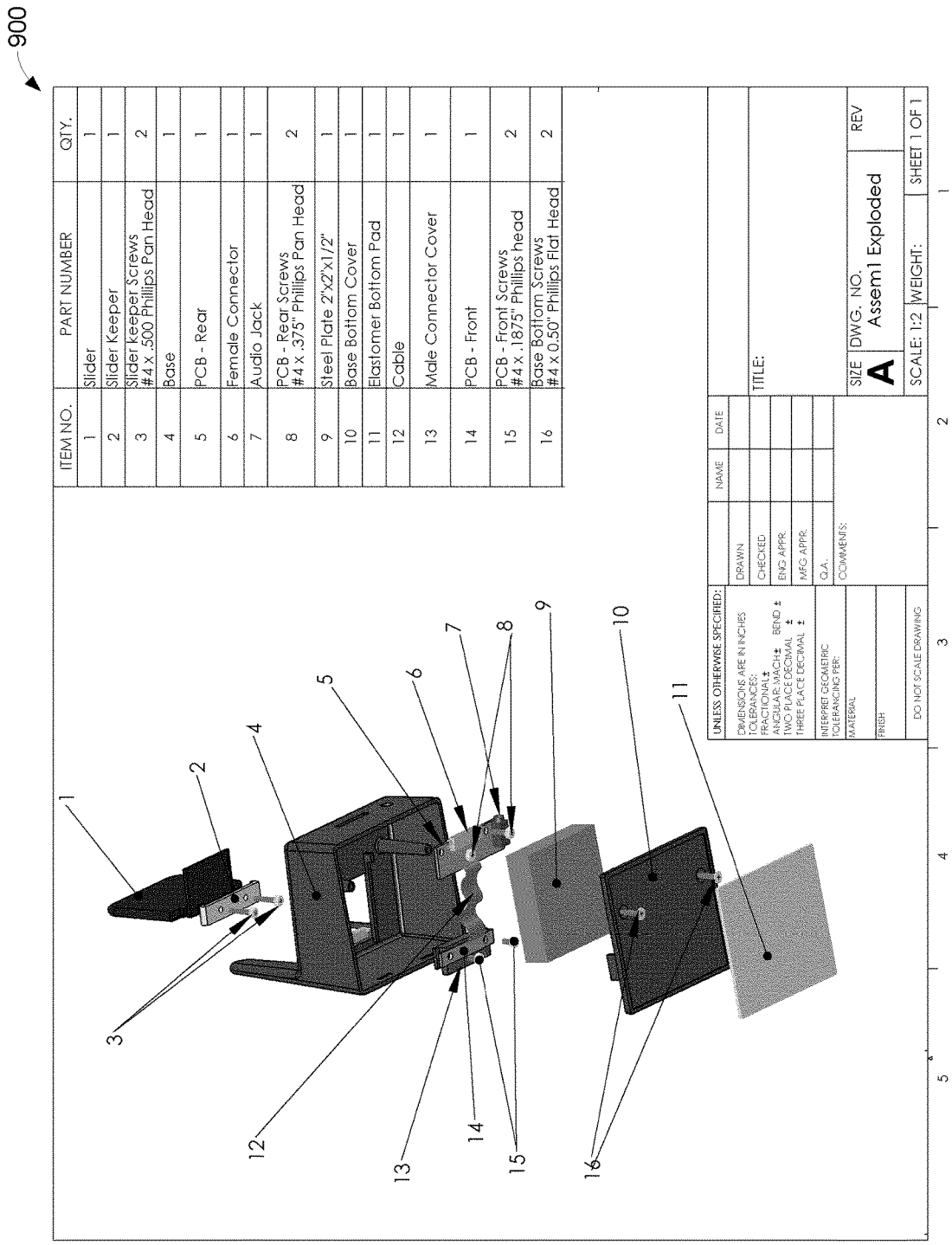

FIG. 9 illustrates, generally at 900, one embodiment of the invention showing an assembly breakdown as illustrated and noted.

FIG. 10 illustrates, generally at 1000, one embodiment of the invention showing various views. From top left clockwise: front view, angle left, left side, angle left rear, and rear.

FIG. 11 illustrates, generally at 1100, one embodiment of the invention showing various views. Left side—angle from rear. Right side—side view.

Figure 12:

FIG. 12 illustrates, generally at 1200, one embodiment of the invention showing a perspective view of holding a phone.

Figure 13:
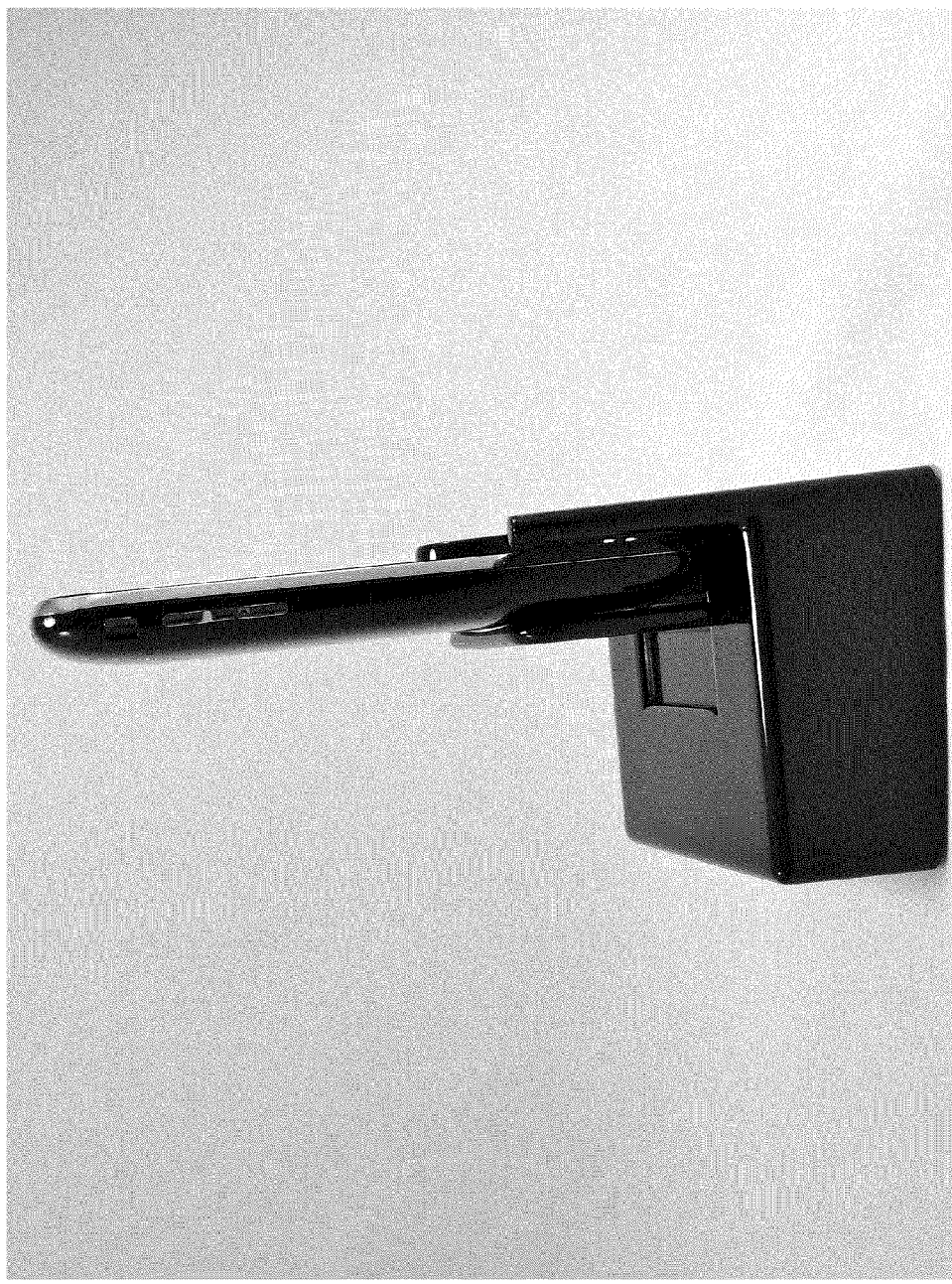

FIG. 13 illustrates, generally at 1300, one embodiment of the invention showing a side view of holding a phone. N.B. the curved back slidable support in this embodiment. In other embodiments the slidable back support may have other shapes and features, for example, but not limited to, a flat surface, a soft touch surface, a rubberized surface, a stepped surface, a textured surface, a compressible surface (e.g. compressible foam on surface), an optically illuminated surface (e.g. an LED (light emitting diode) to indicate when docked properly), etc.

FIG. 14 illustrates, generally at 1400, one embodiment of the invention showing various views of holding a phone.

Figure 15:
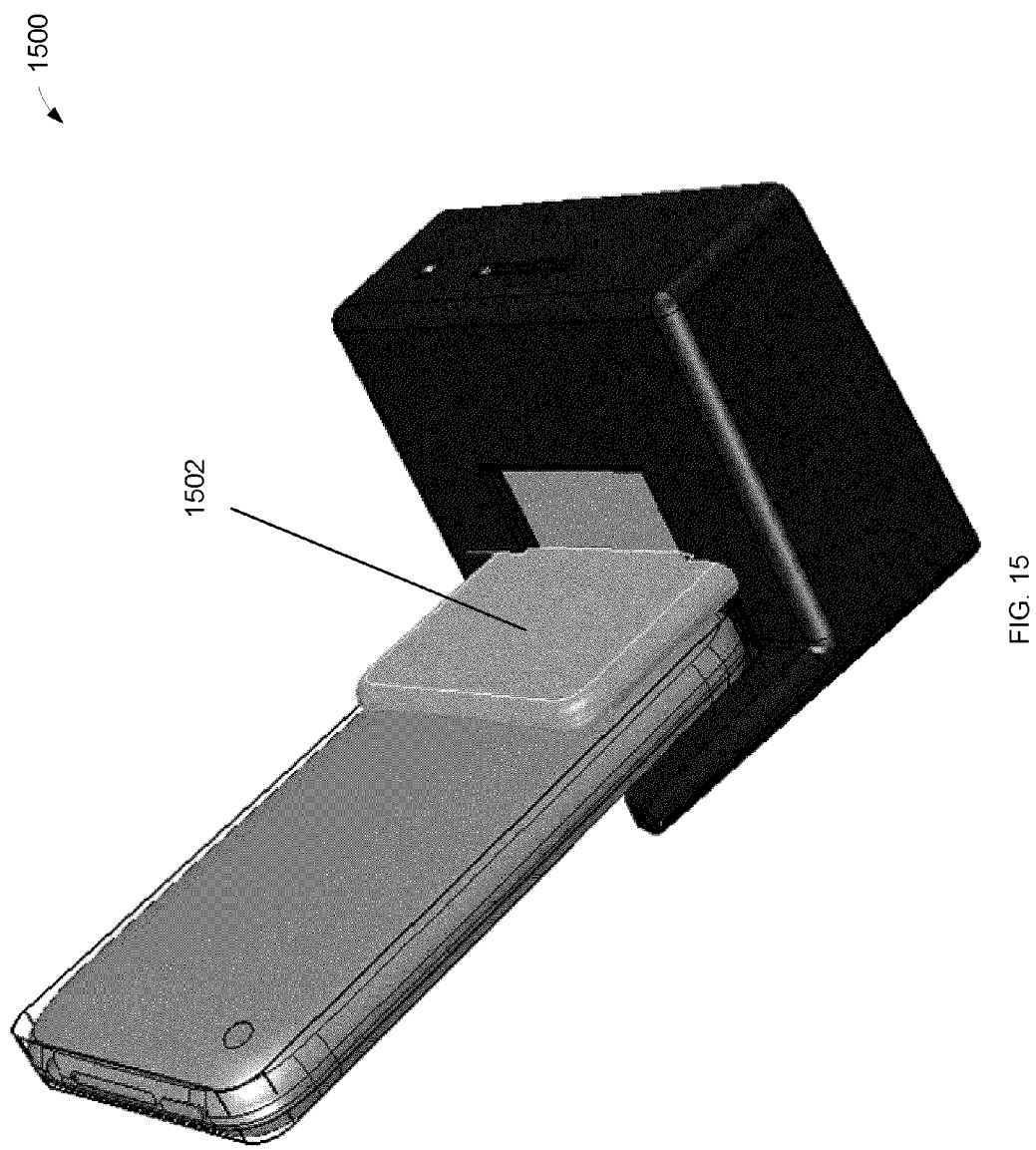

FIG. 15 illustrates, generally at 1500, one embodiment of the invention showing a highlighted slidable back support 1502.

Figure 16:
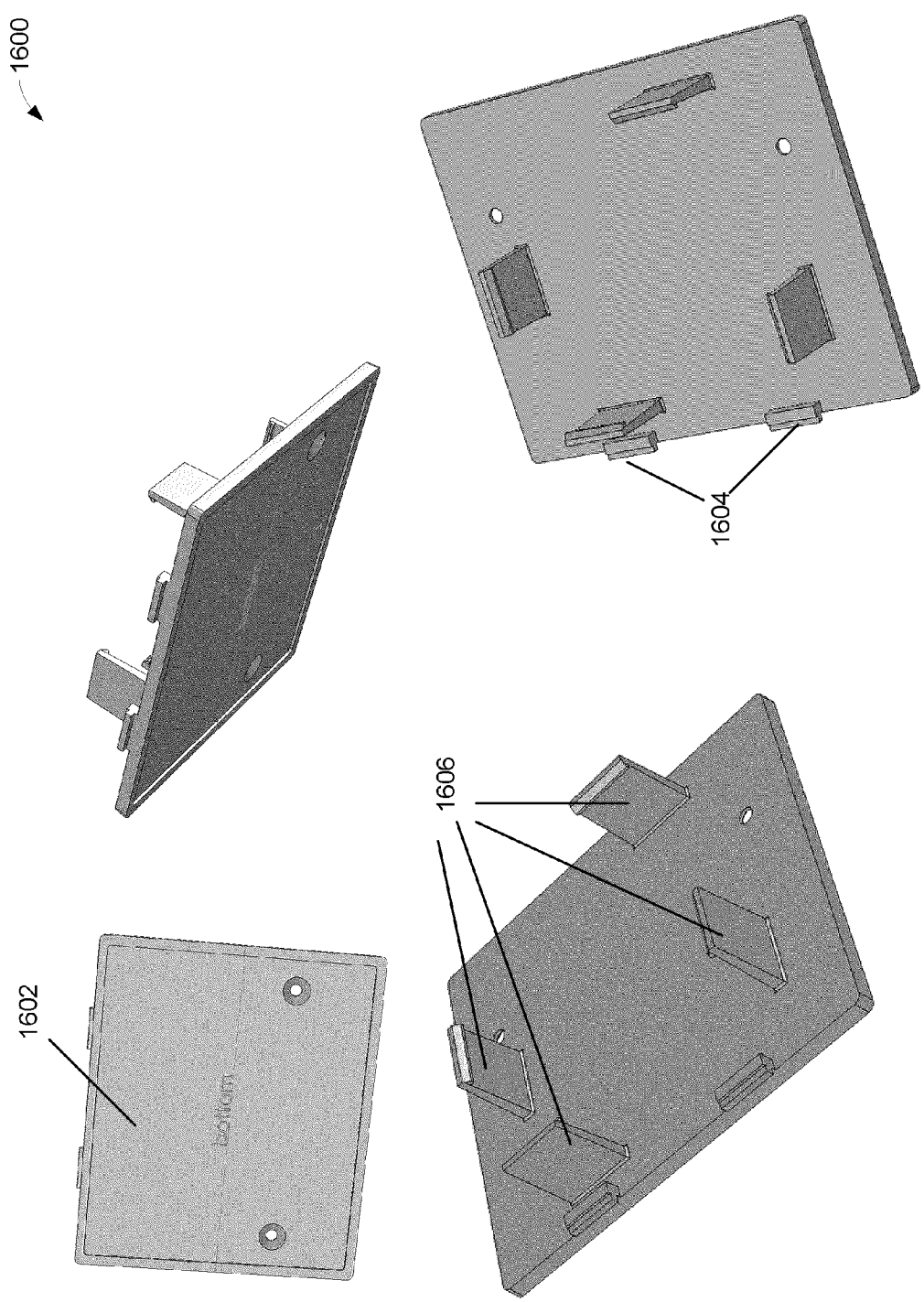

FIG. 16 illustrates, generally at 1600, one embodiment of the invention showing various views of a bottom panel 1602, having mounting protrusions 1604, and weight retaining clips 1606.

Figure 17:
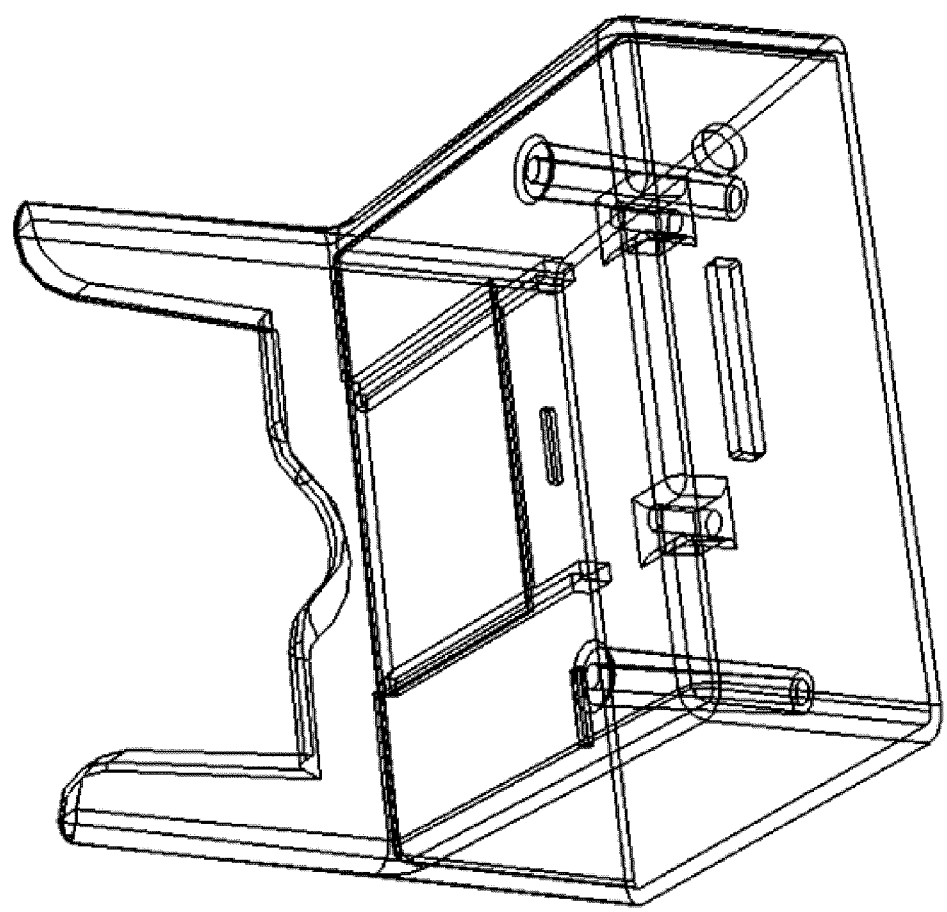

FIG. 17 illustrates, generally at 1700, one embodiment of the invention showing a wireframe of the base.

FIG. 18 illustrates, generally at 1800, one embodiment of the invention showing various views of a slidable back support.

Figure 19:
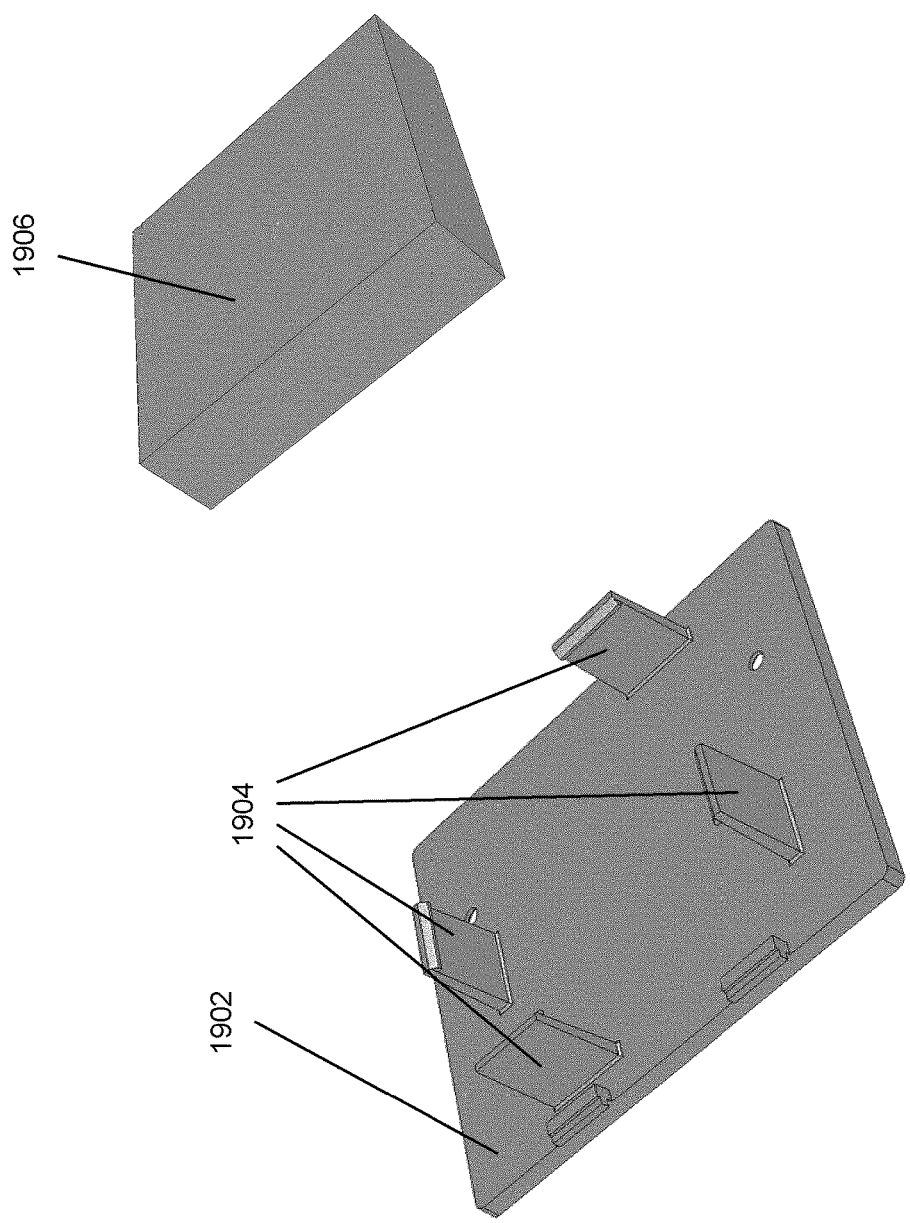

FIG. 19 illustrates, generally at 1900, one embodiment of the invention showing a bottom panel 1902 and weight retaining clips 1904 for holding weight 1906.

Figure 20:
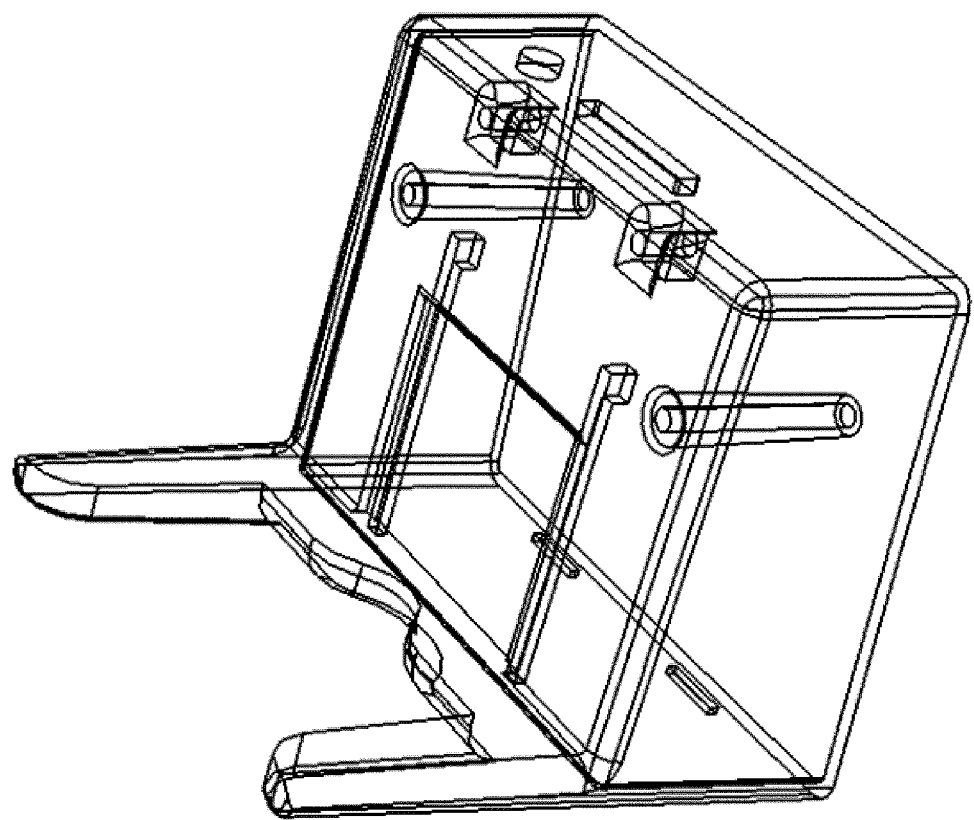

FIG. 20 illustrates, generally at 2000, one embodiment of the invention showing a wireframe of the base.

Figure 21:
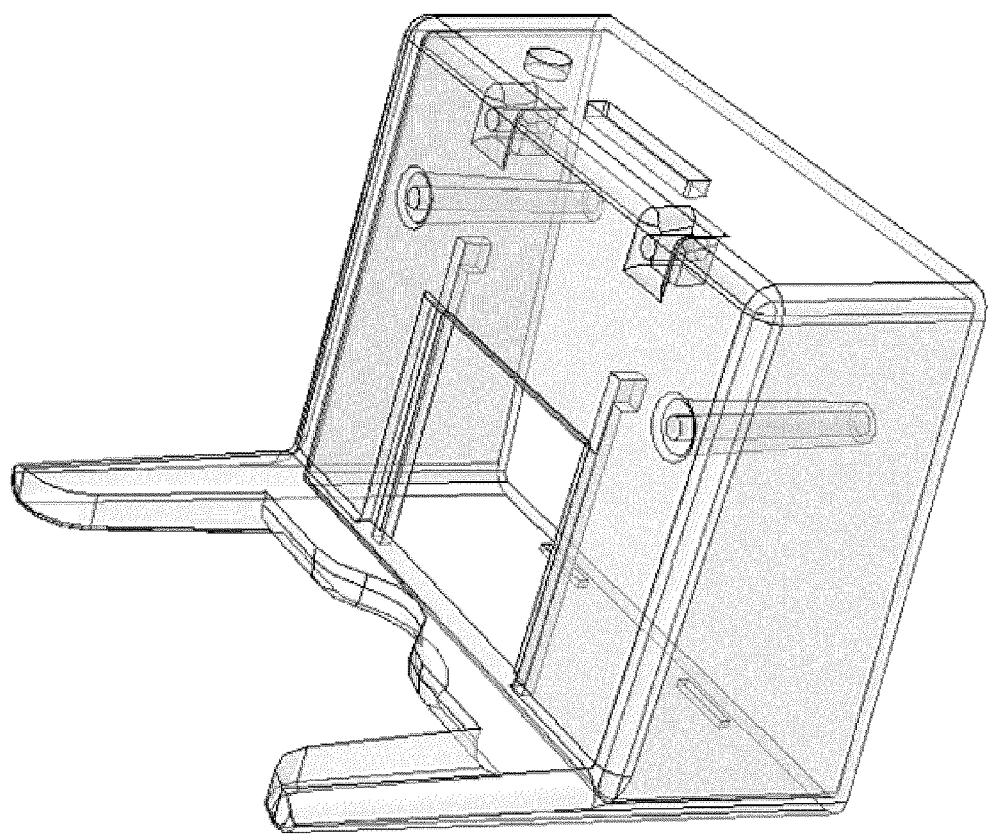

FIG. 21 illustrates, generally at 2100, one embodiment of the invention showing a shaded wireframe of the base.

Figure 22:
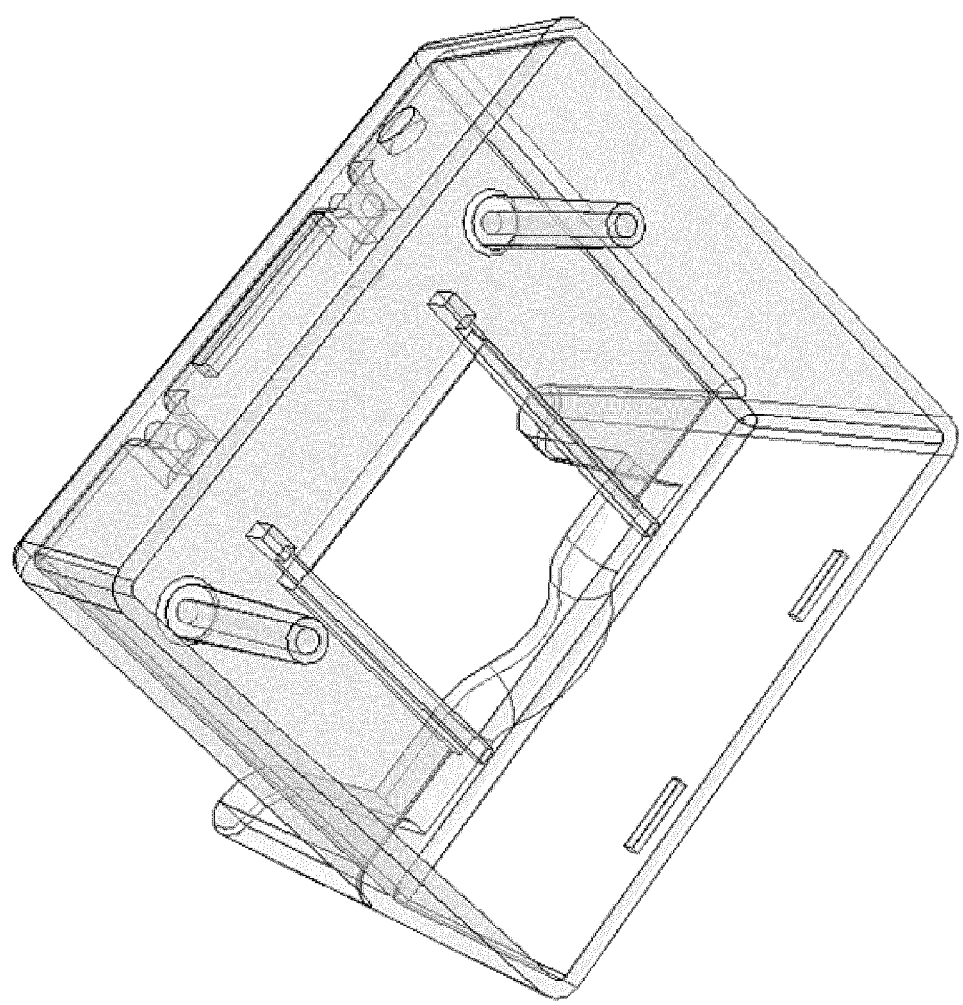

FIG. 22 illustrates, generally at 2200, one embodiment of the invention showing a shaded wireframe of the base from the bottom.

Figure 23:
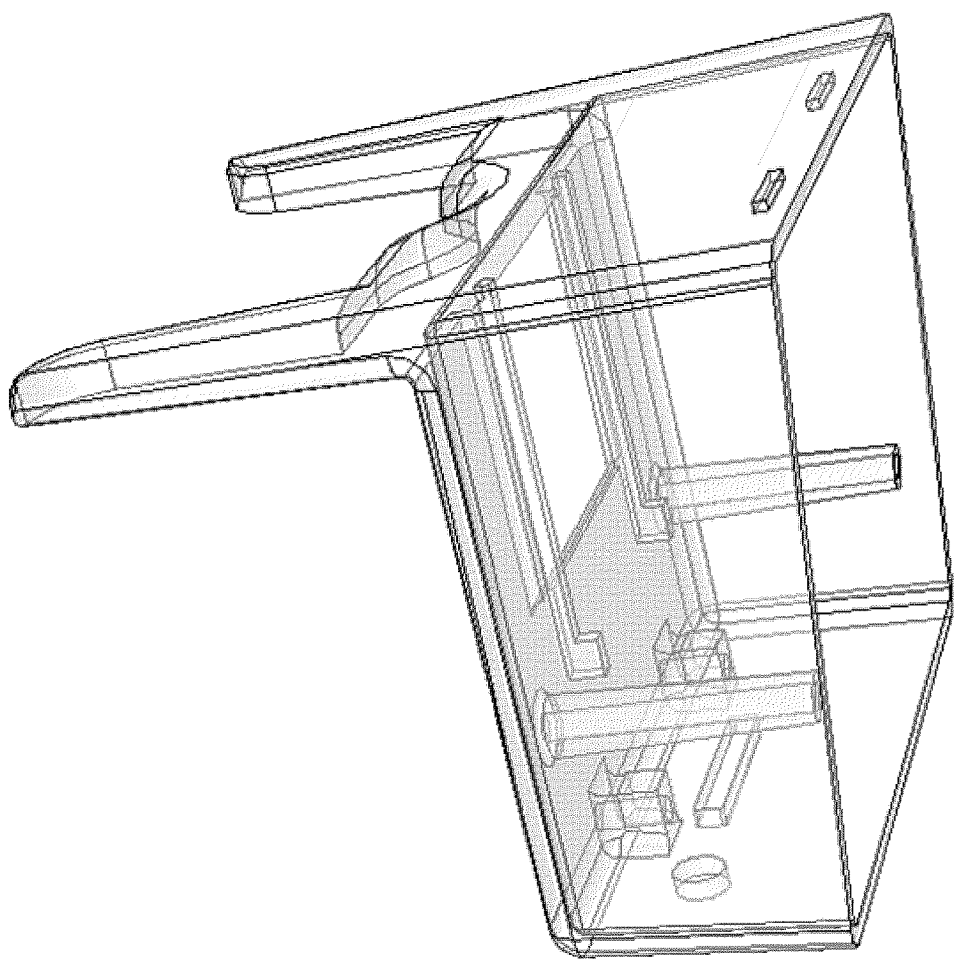

FIG. 23 illustrates, generally at 2300, one embodiment of the invention showing a shaded wireframe of the base from the bottom and back perspective.

Figure 24:
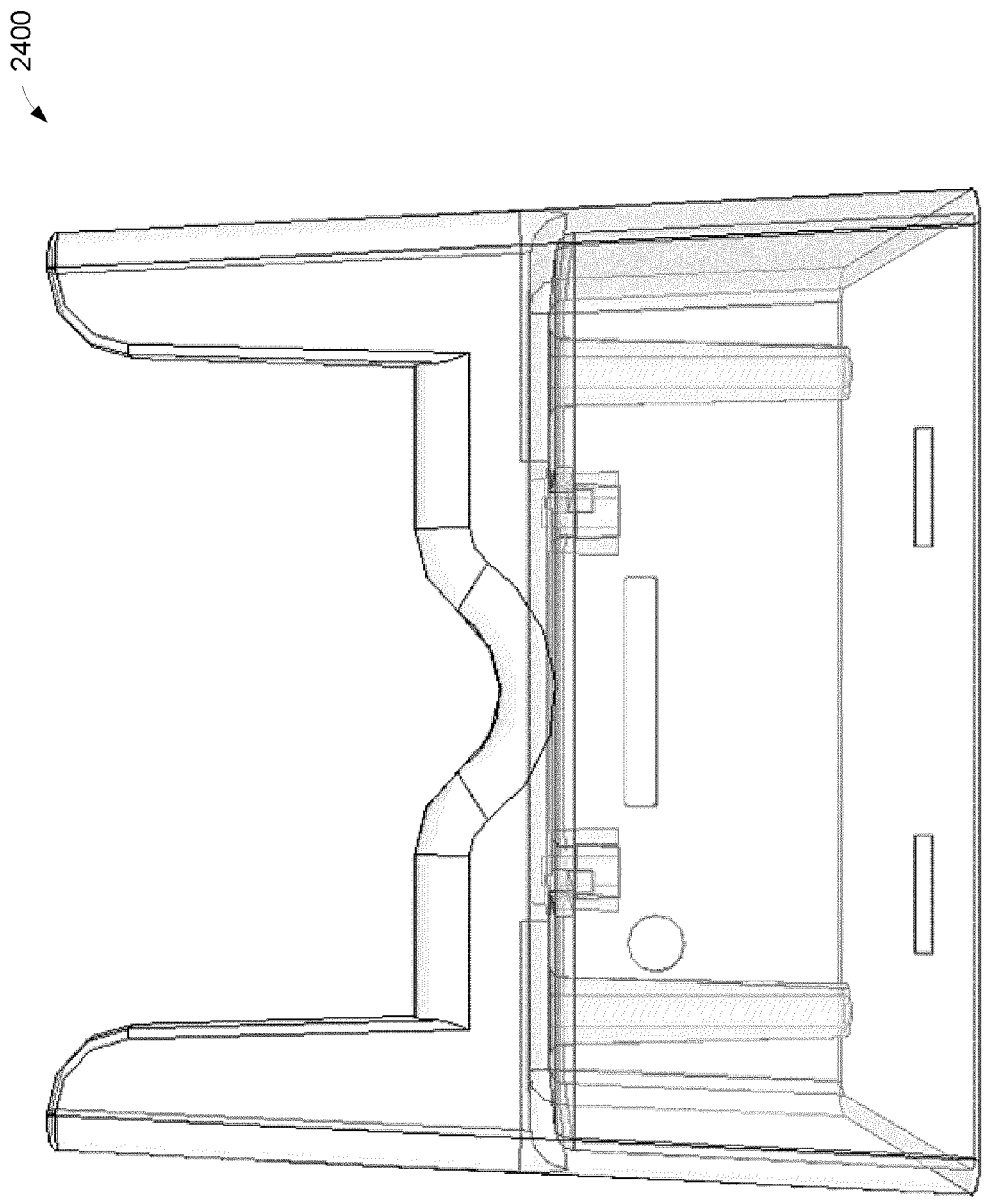

FIG. 24 illustrates, generally at 2400, one embodiment of the invention showing a shaded wireframe of the base from the front.

FIG. 25 illustrates, generally at 2500, one embodiment of the invention showing a flowchart.

Thus a Method and Apparatus for a User Configurable Docking System have been described.

Figure 1:
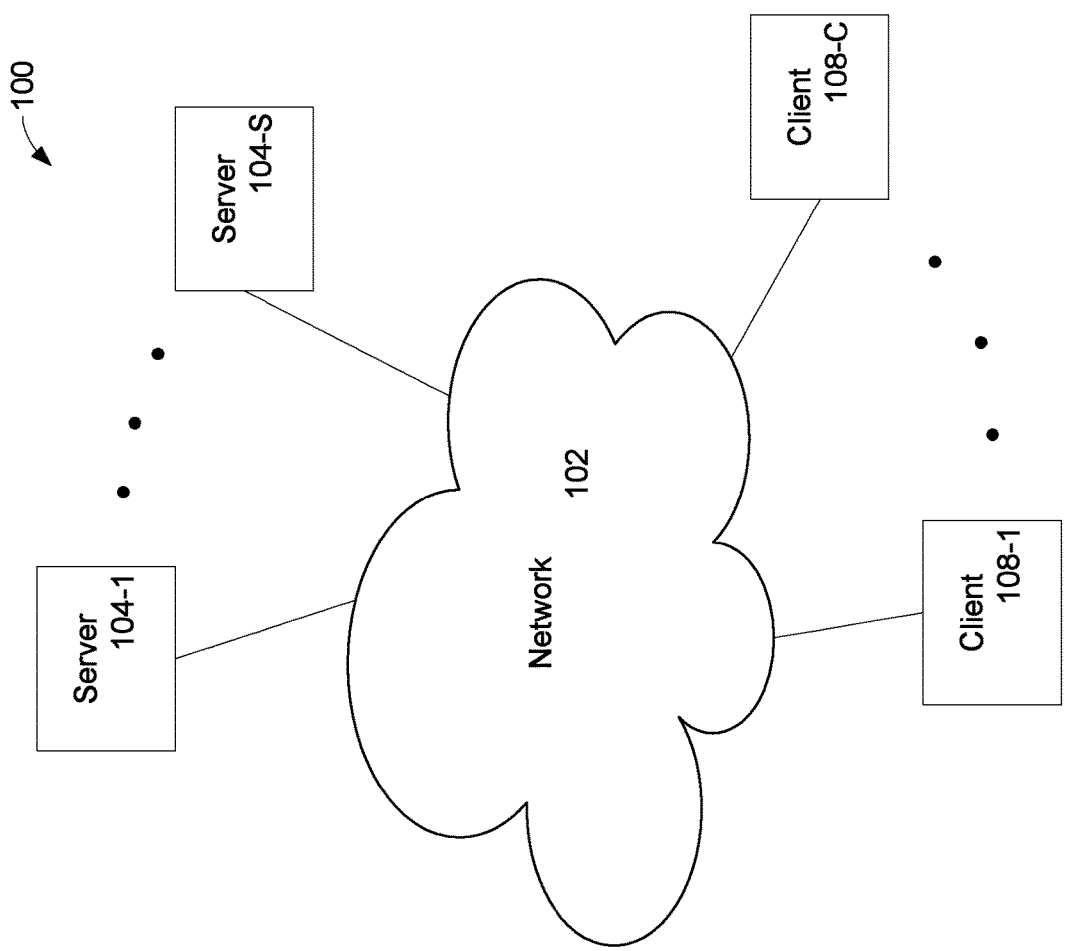
FIG. 1 illustrates a network environment in which the method and apparatus of the invention may be used.

FIG. 1 illustrates a network environment 100 in which the invention described may be used. The network environment 100 has a network 102 that connects S servers 104-1 through 104-S, and C clients 108-1 through 108-C. More details are described below.

Figure 2:
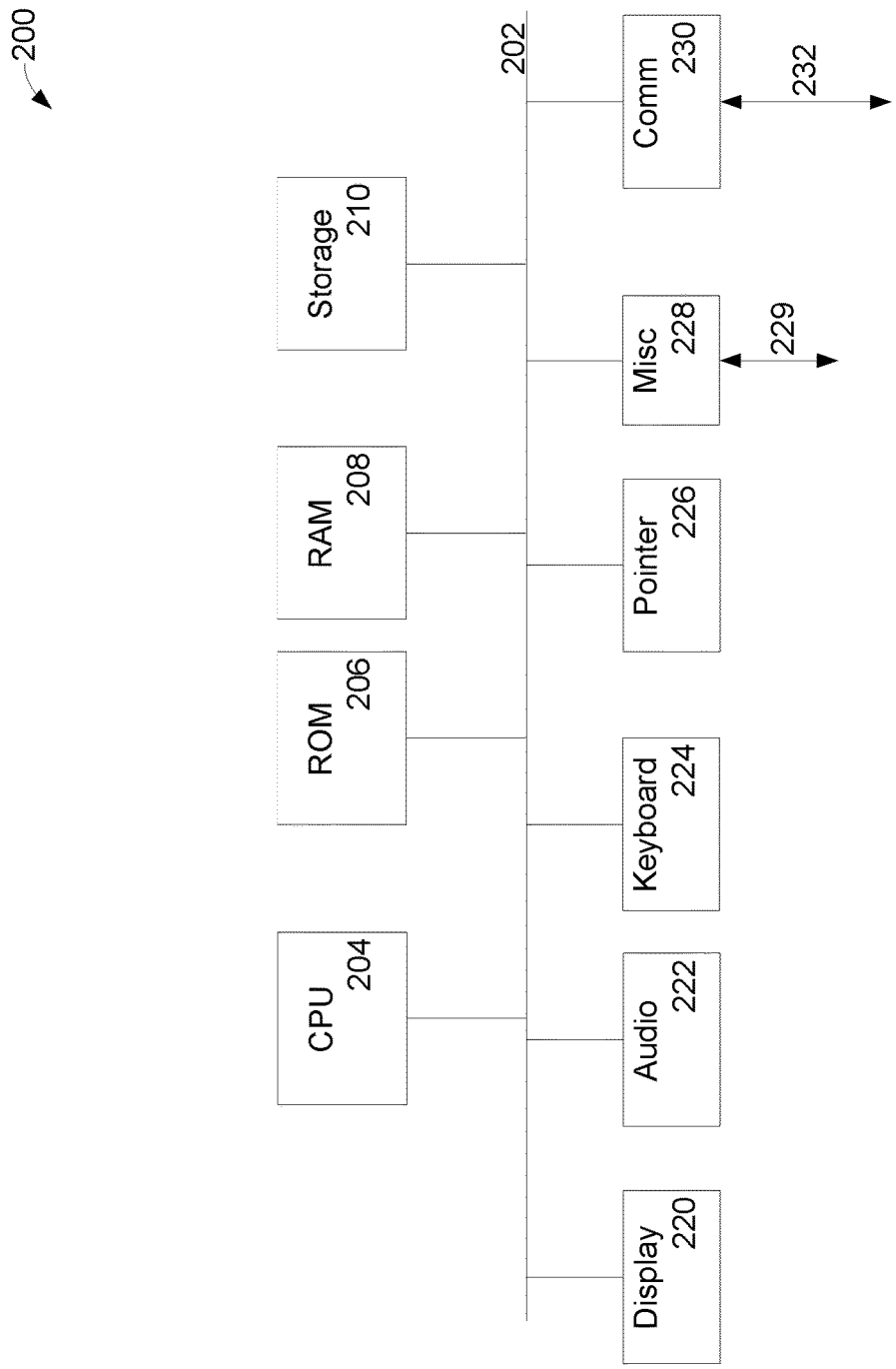

FIG. 2 is a block diagram of a computer system 200 which some embodiments of the invention may employ parts of and which may be representative of use in any of the clients and/or servers shown in FIG. 1, as well as, devices, clients, and servers in other Figures. More details are described below.

Referring back to FIG. 1, FIG. 1 illustrates a network environment 100 in which the techniques described may be controlled. The network environment 100 has a network 102 that connects S servers 104-1 through 104-S, and C clients 108-1 through 108-C. As shown, several computer systems in the form of S servers 104-1 through 104-S and C clients 108-1 through 108-C are connected to each other via a network 102, which may be, for example, a corporate based network. Note that alternatively the network 102 might be or include one or more of: the Internet, a Local Area Network (LAN), Wide Area Network (WAN), satellite link, fiber network, cable network, or a combination of these and/or others. The servers may represent, for example, disk storage systems alone or storage and computing resources. Likewise, the clients may have computing, storage, and viewing capabilities. The method and apparatus described herein may be controlled by essentially any type of communicating means or device whether local or remote, such as a LAN, a WAN, a system bus, etc. For example, a network connection which communicates via for example wireless may control an embodiment of the invention having a wireless communications device. Thus, the invention may find application at both the S servers 104-1 through 104-S, and C clients 108-1 through 108-C.

Referring back to FIG. 2, FIG. 2 illustrates a computer system 200 in block diagram form, which may be representative of any of the clients and/or servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio 222, keyboard 224, pointer 226, miscellaneous input/output (I/O) devices 228 having a link 229, and communications 230 having a port 232. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), Universal Serial Bus (USB), etc. The CPU 204 may be a single, multiple, or even a distributed computing resource. Storage 210, may be Compact Disc (CD), Digital Versatile Disk (DVD), hard disks (HD), optical disks, tape, flash, memory sticks, video recorders, etc. Display 220 might be, for example, a liquid crystal display (LCD). Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

For purposes of discussing and understanding the invention, it is to be understood that various terms are used by those knowledgeable in the art to describe techniques and approaches. Furthermore, in the description, for purposes of explanation, numerous specific details are set forth in order to provide a thorough understanding of the present invention. It will be evident, however, to one of ordinary skill in the art that the present invention may be practiced without these specific details. In some instances, well-known structures and devices are shown in block diagram form, rather than in detail, in order to avoid obscuring the present invention. These embodiments are described in sufficient detail to enable those of ordinary skill in the art to practice the invention, and it is to be understood that other embodiments may be utilized and that logical, mechanical, electrical, and other changes may be made without departing from the scope of the present invention.

Some portions of the description may be presented in terms of algorithms and symbolic representations of operations on, for example, data bits within a computer memory. These algorithmic descriptions and representations are the means used by those of ordinary skill in the data processing arts to most effectively convey the substance of their work to others of ordinary skill in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, can refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

An apparatus for performing the operations herein can implement the present invention. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, hard disks, optical disks, compact disk-read only memories (CD-ROMs), and magnetic-optical disks, read-only memories (ROMs), random access memories (RAMs), electrically programmable read-only memories (EPROM)s, electrically erasable programmable read-only memories (EEPROMs), FLASH memories, magnetic or optical cards, etc., or any type of media suitable for storing electronic instructions either local to the computer or remote to the computer.

The algorithms and displays presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor, or by any combination of hardware and software. One of ordinary skill in the art will immediately appreciate that the invention can be practiced with computer system configurations other than those described, including hand-held devices, multiprocessor systems, microprocessor-based or programmable consumer electronics, digital signal processing (DSP) devices, set top boxes, network PCs, minicomputers, mainframe computers, and the like. The invention can also be practiced in distributed computing environments where tasks are performed by remote processing devices that are linked through a communications network.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application, driver, . . . ), as taking an action or causing a result. Such expressions are merely a shorthand way of saying that execution of the software by a computer causes the processor of the computer to perform a useful action or produce a useful result. Such useful actions/results may be presented to a user in various ways, for example, on a display, producing an audible tone, mechanical movement of a surface, etc.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one of ordinary skill in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals which upon reception causes movement in matter (e.g. electrons, atoms, etc.) (e.g., carrier waves, infrared signals, digital signals, etc.); etc.

As used in this description, "one embodiment" or "an embodiment" or similar phrases means that the feature(s) being described are included in at least one embodiment of the invention. References to "one embodiment" in this description do not necessarily refer to the same embodiment; however, neither are such embodiments mutually exclusive. Nor does "one embodiment" imply that there is but a single embodiment of the invention. For example, a feature, structure, act, etc. described in "one embodiment" may also be included in other embodiments. Thus, the invention may include a variety of combinations and/or integrations of the embodiments described herein.

As used in this description, "substantially" or "substantially equal" or similar phrases are used to indicate that the items are very close or similar. Since two physical entities can never be exactly equal, a phrase such as "substantially equal" is used to indicate that they are for all practical purposes equal.

It is to be understood that in any one or more embodiments of the invention where alternative approaches or techniques are discussed that any and all such combinations as my be possible are hereby disclosed. For example, if there are five techniques discussed that are all possible, then denoting each technique as follows: A, B, C, D, E, each technique may be either present or not present with every other technique, thus yielding 2^5 or 32 combinations, in binary order ranging from not A and not B and not C and not D and not E to A and B and C and D and E. Applicant(s) hereby claims all such possible combinations. Applicant(s) hereby submit that the foregoing combinations comply with applicable EP (European Patent) standards. No preference is given any combination.

Thus a Method and Apparatus for a User Configurable Docking System have been described.

What is claimed is:

1. A method for a configurable docketing system comprising:
providing an electrical connector attached to a base, said electrical connector mates along a connector mating axis with a phone connector inserted into said electrical connector, and wherein said electrical connector does not slide along said connector mating axis;
providing a support situated on said base, said support adjustable such that said support makes contact with an inserted phone having said phone connector;
wherein said electrical connector is connected to a printed circuit board, said printed circuit board located within said base; and
wherein two portions of a non-movable front support attached to said base are taller than said support, and wherein said non-movable front support has a "U" style slot located in a middle position of said non-movable front support for allowing access to a home button on said inserted phone.

2. The method of claim 1 wherein said non-movable front support has a height less than one third of a height of said inserted phone.

3. A configurable docketing apparatus comprising:

an electrical connector assembly having a first end and a second end, said first end mates along a connector mating axis with a phone connector inserted into said first end, wherein said first end does not slide along said connector mating axis, and wherein said electrical connector assembly is slidably attached to a base;

a support situated on said base, said support makes contact with an inserted phone having said phone connector inserted into said first end of said electrical connector assembly;

wherein said phone connector is connected to a printed circuit board, said printed circuit board located within said base;

wherein said support covers only a portion of said inserted phone; and wherein two portions of a non-movable front support attached to said base are taller than said support, and wherein said non-movable front support has a "U" style slot located in a middle position of said non-movable front support for allowing access to a home button on said inserted phone.

4. The configurable docketing apparatus of claim 3 wherein said support has a width, said support width less than a width of said inserted phone and said front support has a width, said front support width greater than said support width.

\* \* \* \* \*